United States Patent [19]

Beard

[11] 4,011,476

[45] Mar. 8, 1977

[54] SIGNAL GENERATING MECHANISM

[75] Inventor: Garry E. Beard, Livonia, Mich.

[73] Assignee: Ford Motor Company, Dearborn, Mich.

[22] Filed: Dec. 22, 1975

[21] Appl. No.: 643,417

[52] U.S. Cl. .......................... 310/70 R; 123/148 R; 310/DIG. 3; 322/DIG. 5; 324/179

[51] Int. Cl.² ...................... F02P 1/00; H02K 11/00

[58] Field of Search ................. 310/40, 70 R, 70 A, 310/DIG. 3; 322/47, 51, DIG. 5; 123/148 R, 148 E, 149 R; 324/168, 169, 179; 73/518

[56] References Cited

UNITED STATES PATENTS

| | | | |
|---|---|---|---|
| 3,018,395 | 1/1962 | Carlstein | 322/DIG. 5 |
| 3,258,550 | 6/1966 | Guetersloh et al. | 310/70 R |
| 3,715,650 | 2/1973 | Draxler | 322/51 |
| 3,783,314 | 1/1974 | Kostan | 310/70 R |

*Primary Examiner*—Robert J. Hickey
*Attorney, Agent, or Firm*—Keith L. Zerschling; Robert W. Brown

[57] ABSTRACT

A signal generating mechanism for producing a pulsed DC electrical voltage signal having a frequency proportional to the angular velocity of a rotating shaft. The signal generating mechanism may be used in the distributor of a breakerless ignition system for a multi-cylinder internal combustion engine, in which case the frequency of the pulsating voltage signal is equal to the rate at which ignition sparks are to be generated. The signal generating mechanism includes a baseplate and a bushing through which the rotating shaft passes. A stator assembly is formed by a hub and lower and upper plates affixed thereto, the stator assembly being rotatable about the bushing and further including at least one Hall effect sensor and integrated circuit mounted in a nonmagnetic supporting structure secured to the upper plate. A permanent magnet also is attached to the supporting structure and is radially spaced from the Hall effect sensor and integrated circuit. A rotor assembly is attached to the shaft and has depending vanes extending into the space between the permanent magnet and the Hall effect sensor and integrated circuit. The number of vanes corresponds to the number of cylinders in the internal combustion engine, and the vanes come into and go out of alignment with the permanent magnet and the Hall effect sensor and integrated circuit. This produces a switching action in the integrated circuit through the action of the Hall effect sensor and results in the aforementioned DC pulsating voltage signal.

3 Claims, 6 Drawing Figures

FIG. 1.
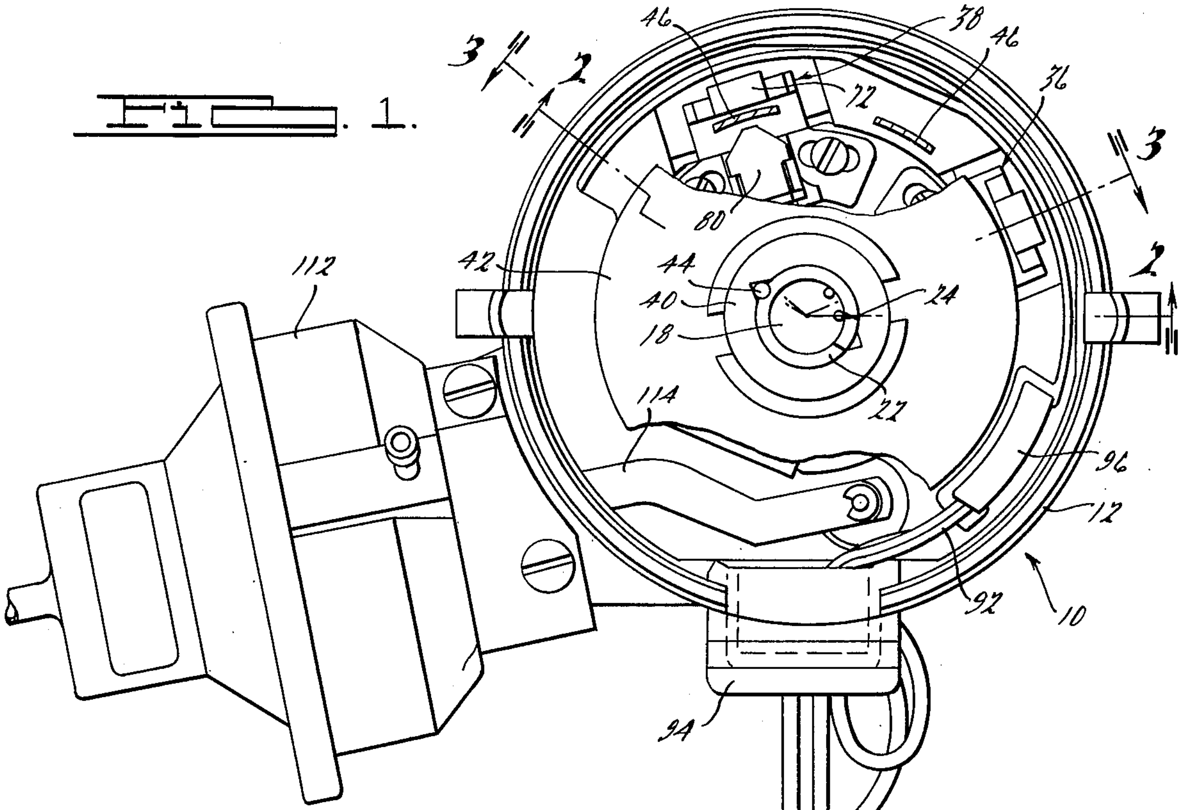
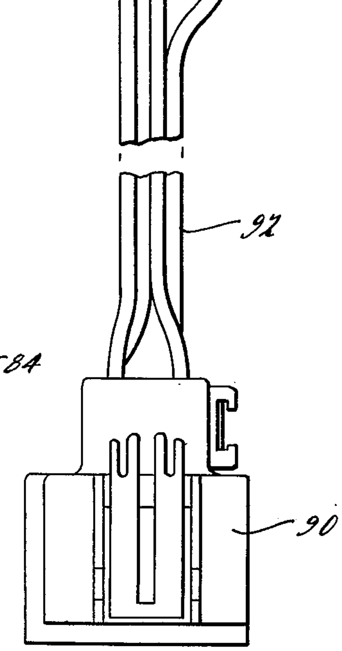
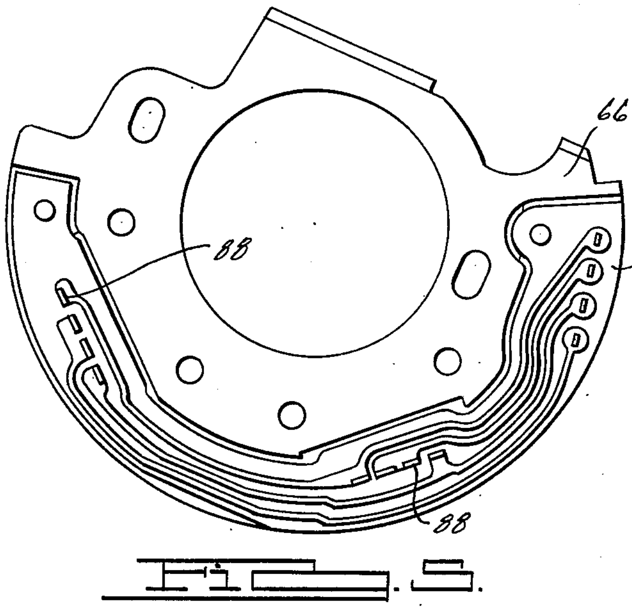
FIG. 5.

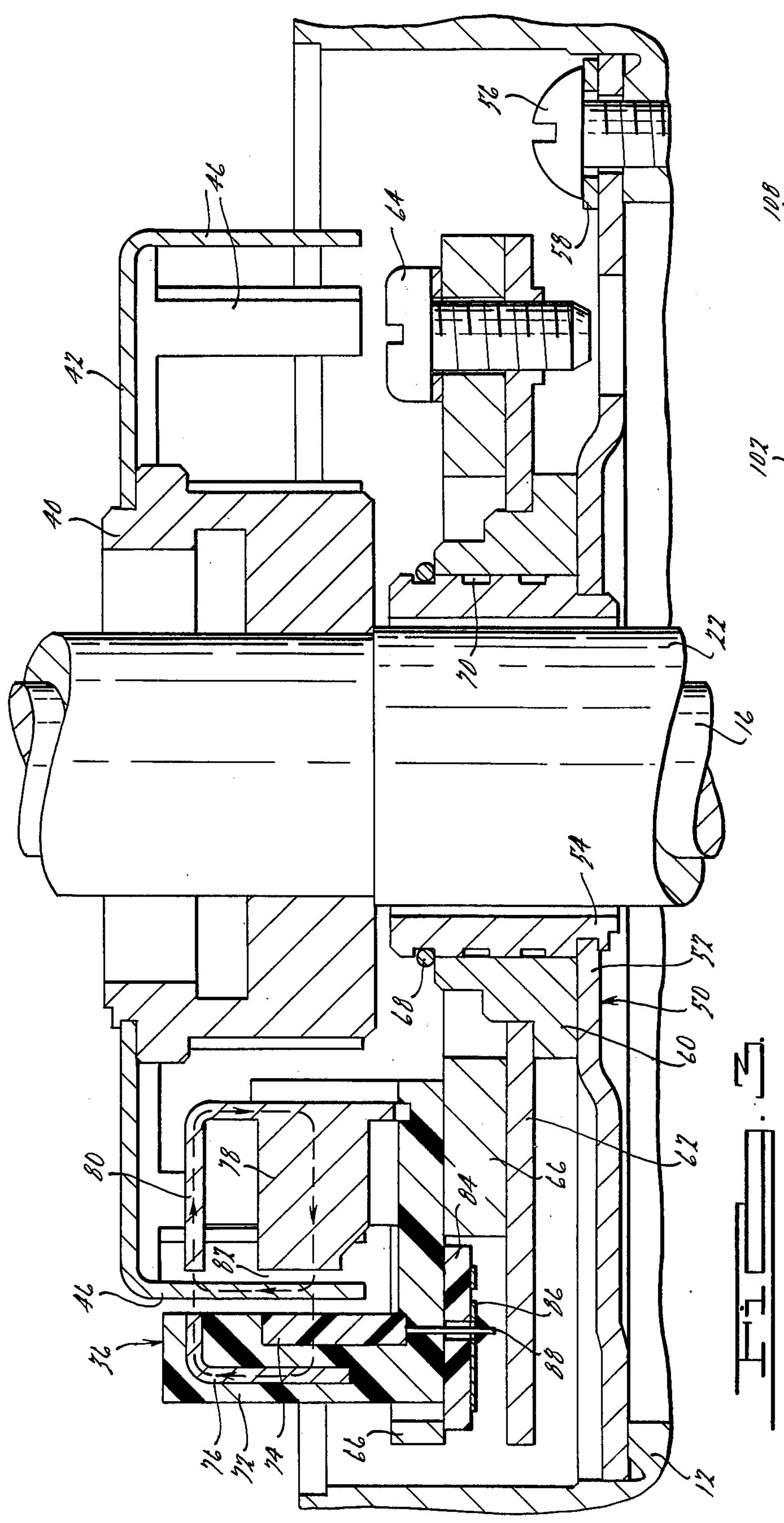
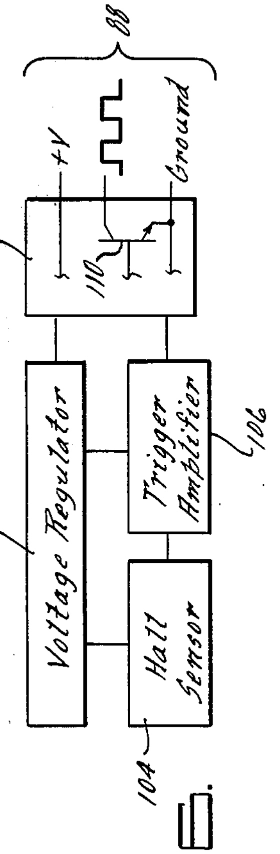
88
+V
Ground
108
110
Voltage Regulator
102
Hall Sensor
104
Trigger Amplifier
106

SIGNAL GENERATING MECHANISM

BACKGROUND

This invention relates to a signal generating mechanism for producing an electrical signal in the form of a pulsating DC voltage. The signal has a frequency proportional to the angular velocity of a rotating shaft and may have a duty cycle which is a fixed percentage of the period of the pulsating DC electrical signal. The signal generating mechanism is particularly suitable for use in a distributor of a breakerless ignition system for a multi-cylinder internal combustion engine.

Common past practice in ignition systems for multicylinder internal combustion engines has been to employ a set of breaker points in a distributor to generate sparks as required by the engine. Recently, these breaker points have been replaced by breakerless ignition systems that employ alternating current signal generating mechanisms, such as the signal generating mechanism shown in U.S. Pat. No. 3,783,314 issued Jan. 1, 1974 in the name of Charles C. Kostan and assigned to the assignee of the present invention. These alternating current signal generating mechanisms determine the times or instants at which the breakerless ignition system generates sparks in the various engine combustion chambers. Although signal generating mechanisms of this type produce an alternating voltage signal having a frequency proportional to the angular velocity of a rotating shaft, the voltage signal has an amplitude that is proportional to the angular velocity. This is disadvantageous at low angular velocities.

It has been proposed in the prior art that a Hall effect magnetic sensor be utilized to generate an electrical signal having a frequency proportional to the angular velocity of a rotating shaft. U.S. Pat. No. 3,875,920 issued Apr. 8, 1975 to Marshall Williams describes a signal generating mechanism of this kind used in the ignition system for an internal combustion engine. The signal generating mechanism described in this patent includes a stator having a C-shaped permanent magnet structure with a Hall effect sensor positioned between the north and south poles of the permanent magnet structure. A rotor has depending vanes which, when in alignment with the poles of the permanent magnet structure, shunt the magnetic field thereof and reduce the magnetic field in the Hall effect sensor. A similar structure is illustrated in U.S. Pat. No. 3,861,370 issued Jan. 21, 1975 to H. E. Howard.

SUMMARY OF THE INVENTION

In accordance with the invention, a signal generating mechanism for producing a pulsating DC electrical signal having a frequency proportional to the angular velocity of a rotating shaft comprises a baseplate having an annular opening therein and a bushing affixed in the annular opening. The shaft passes through the bushing. A stator assembly is positioned above the baseplate and includes a hub positioned around a portion of the bushing affixed to the baseplate. Attached to the hub is a lower plate, parallel with the baseplate, and an upper plate attached to the lower plate. The upper plate is made from a nonmagnetic material. The stator assembly may include one or more Hall effect sensors and associated integrated circuits mounted in a suitable nonmagnetic support structure attached to the upper plate. In radial alignment with the Hall effect sensor and associated integrated circuit and radially inward therefrom with respect to the rotating shaft is a permanent magnet and associated pole-piece. On the opposite or radially outer side of the Hall effect sensor and integrated circuit, a magnetic pole-piece is located in the support structure.

A rotor is attached to the shaft for rotation therewith and has a generally cup-like shape with depending vanes extending into a space between the permanent magnet and the Hall effect sensor and integrated circuit. Where the signal generating mechanism is used in an ignition system, the number of vanes corresponds to the number of engine cylinders. As the rotor rotates, the vanes come into and go out of alignment with the Hall effect sensor and, when in alignment therewith, short-circuit the magnetic field which otherwise would pass through the Hall effect sensor. This produces a change in the state of conductivity of an output transistor in the integrated circuit associated with the Hall effect sensor.

The Hall effect sensor and the associated integrated circuit are formed as an integral electronic package encapsulated in a suitable material and mounted in the stator support structure. The leads from and to the integrated circuit and Hall effect sensor extend through the upper plate of the stator assembly where they form contact with a printed circuit board attached to the upper plate in a location between this plate and the lower plate of the stator assembly. Where more than one Hall effect sensing element and associated integrated circuit is utilized in the stator assembly, the printed circuit board is common to all of the Hall effect sensors and associated integrated circuits.

The invention may be better understood by reference to the detailed description which follows and to the drawings.

BRIEF DESCRIPTION OF THE DRAWINGS

FIG. 1 is a plan view of a distributor for an internal combustion engine having eight cylinders and the distributor includes a mechanism according to the invention for generating two separate pulsating DC electrical signals;

FIG. 3 is an enlarged sectional view of the signal generating mechanism of FIGS. 1 and 2, the section being taken along the line 3—3 in FIG. 1;

FIG. 5 is a bottom view of the stator assembly of FIG. 4; and

FIG. 6 is a schematic electrical block diagram of a Hall effect sensor and associated integrated circuit that may be utilized in the signal generating mechanism of the invention.

DETAILED DESCRIPTION

Figure 2:
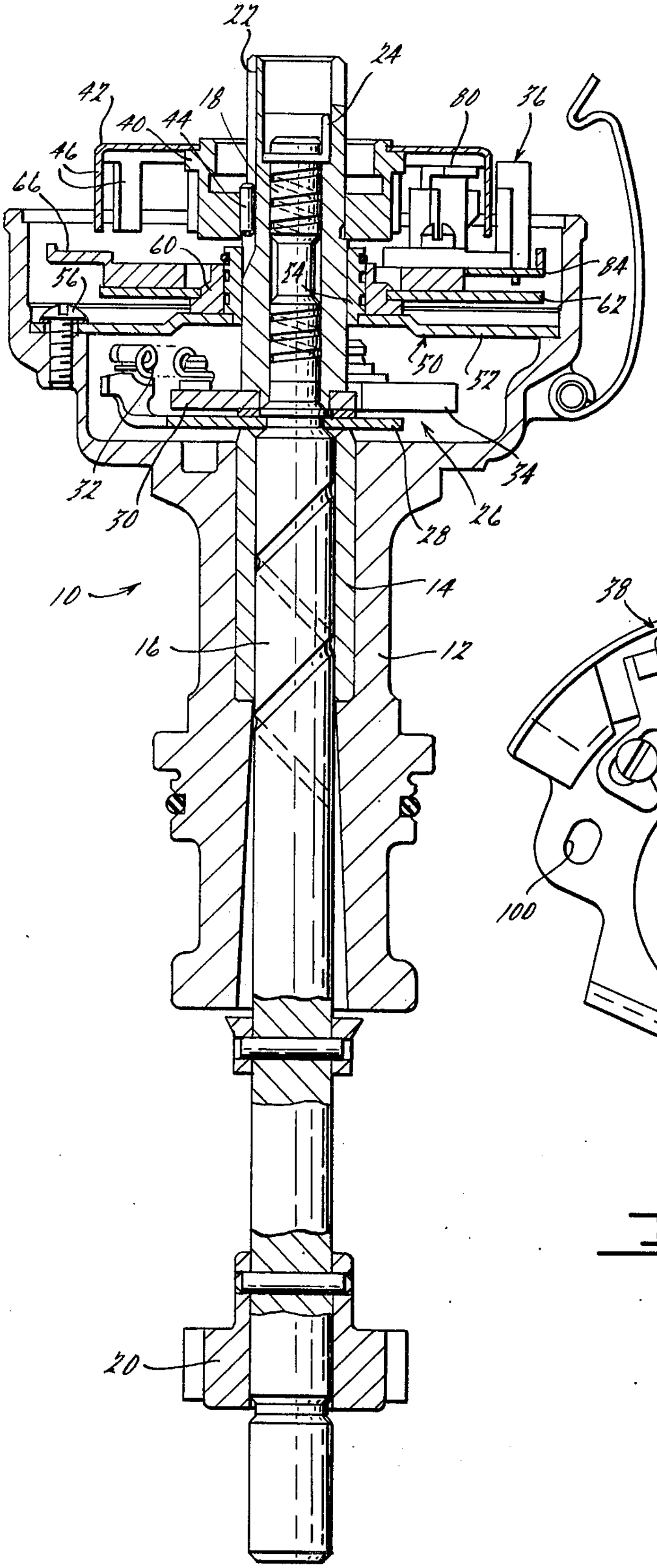
FIG. 2 is a sectional view of the signal generating mechanism of FIG. 1, the section being taken along the line 2—2 in FIG. 1.

With particular reference now to the drawings, wherein like numerals refer to like parts in the several views, and with specific reference to FIGS. 1 through 3, there is shown an ignition system distributor 10 for supplying sparks to an eight cylinder internal combustion engine. The distributor 10 includes a housing 12 having a cylindrical bearing 14 positioned therein. A shaft 16 is rotatably journalled within the bearing 14. The shaft 16 is driven by a gear 20 that, in use, meshes with another gear (not shown), driven by the internal combustion engine. The shaft 16 has a reduced-diameter portion 18, and both the larger-diameter and reduced-diameter portions of the shaft contain grooves for lubrication purposes.

A sleeve 22 fits over the reduced-diameter portion 18 of the shaft 16. The sleeve 22 is retained on the shaft 16 with a wire retainer 24. The sleeve 22 is rotatably mounted on the reduced-diameter portion 18 of the shaft 16, and rotation of the sleeve relative to the shaft is controlled by a centrifugal advance mechanism of the usual design.

The centrifugal advance mechanism generally designated by the numeral 26 comprises a plate 28 affixed to the shaft 16 and a plate 30 affixed to the sleeve 22. In the usual manner, the plates 28 and 30 are coupled together by means of springs 32. The force of the springs must be overcome to permit the plate 30 and the sleeve 22 to rotate about the plate 26 and shaft 16. When the shaft 16 rotates, weights 34, pivotally connected to the plate 28, exert a force that acts against that of the springs 32 and tends to rotate the plate 30 and sleeve 22 with respect to the shaft 16. The magnitude of this force is proportional to the shaft angular velocity. This provides a centrifugal advance in the ignition timing. For the purpose of the present invention, the sleeve 22 may be regarded as a part of the shaft 16 with which it rotates.

The ignition system distributor 10 is shown without the usual cap and high-voltage distribution rotor. It should be understood that these elements or the equivalent would be present in a complete distributor installation. The distributor cap may be of the usual configuration in which a plurality of electrical contacts are connected by high-voltage leads to spark plugs for the eight cylinder internal combustion engine. The high-voltage distribution rotor would be secured to the sleeve 22 and would rotate with it to distribute voltage from the high-voltage side of an ignition coil to the electrical leads to the various spark plugs.

Figure 4:
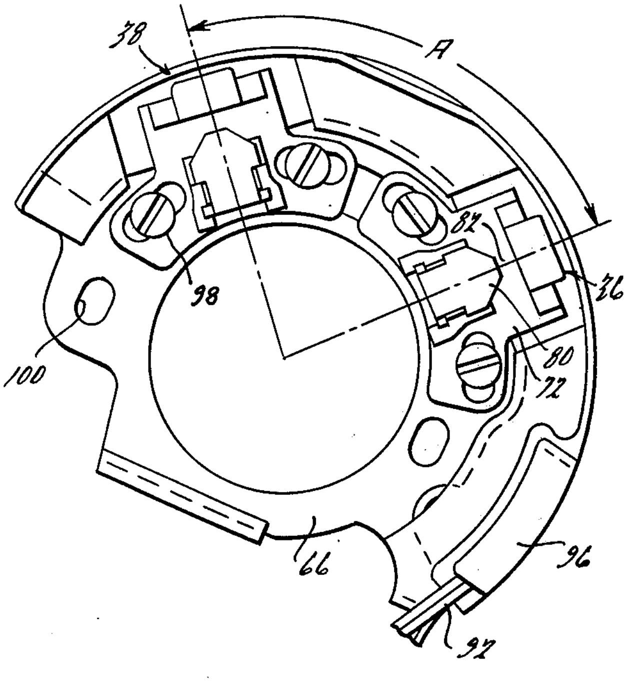
FIG. 4 is a plan view of the stator assembly utilized in the signal generating mechanism of FIGS. 1 through 3.

The distibutor 10 includes two identical and spaced-apart mechanisms, sharing a common rotor assembly, for generating pulsating DC electrical voltage signals. These signal generating mechanisms each include a Hall effect sensor and associated integrated circuit. The signal generating mechanisms are generally designated by the numerals 36 and 38. The signal generating mechanisms 36 and 38 may be separated by an angle A as shown in FIG. 4, which may be, for example, about 84°. The signal generating mechanism 36 and 38 each produce an output electrical signal in the form of a pulsating DC voltage having a pulse repetition rate or frequency proportional to the angular velocity of the rotating shaft 16 and sleeve 22, which rotate in a counter-clockwise direction as viewed in FIG. 1. In the embodiment of the invention illustrated in the drawings, the two signals each has a frequency equal to the rate at which sparks are to be generated by the ignition system, but the two signals are of different phase where the angle A is other than 90° or a multiple thereof. If the angle A is 84°, the signal generated by the signal generating mechanism 38 will occur six degrees of shaft 16 rotation ahead of the signal produced by the signal generating mechanism 36. Thus, the signal from the signal generating mechanism 38 may be utilized to provide an advance in the ignition timing of six degrees relative to the signal produced by the signal generating mechanism 36.

The rotor assembly, common to both of the signal generating mechanisms 36 and 38, comprises a hub 40 and cup-shaped rotor 42 attached to this hub, both of which are secured to the sleeve 22 with a roll-pin 44 inserted in a V-shaped groove in the sleeve 22. The rotor 42 has eight depending vanes 46 of preferably equal size and equally spaced from one another. The number of vanes corresponds to the number of cylinders in the internal combustion engine. Preferably, the rotor 42 is made from stamped steel, a ferromagnetic material, and may have a dichromate treatment. The width of the vanes and the spacing between them determines the duty cycle of the generated pulsating DC electrical signals.

With particular reference now to FIGS. 3 through 5, there is shown the stator assembly, generally designated by the numeral 50. The stator assembly 50 includes a baseplate 52 having an annular opening therein in which an annular bushing 54 is located. The shaft 16 and associated sleeve 22 pass through the bushing 54 and rotate freely within it. The baseplate 52 is positioned perpendicular to the axis of the shaft and is secured to the distributor housing 12 by a plurality of screws 56 and washers 58.

The stator assembly further includes a hub 60 positioned for rotation about the radially exterior side of the portion of the bushing 54 that extends above the baseplate 52. A lower plate 62 is securely attached to the hub 60. Screws 64 secure an upper plate 66, preferably made from a nonmagnetic material such as a zinc die-casting, to the lower plate 62. The hub 60, lower plate 62, the upper plate 66 are held in place by a retaining ring 68. Grooves 70 are provided for retention of a lubricant.

The signal generating mechanisms 36 and 38 each include a support structure 72 preferably made from a molded plastic material enclosing an encapsulated Hall effect sensor and integrated circuit package 74 and a magnetic material pole-piece 76 located on the radially exterior side of the vanes 46 of rotor 42. A permanent magnet 78 is also mounted in the support structure 72, but is located on the radially interior side of the vanes 46 and has one of its poles positioned in alignment with the encapsulated Hall effect sensor and integrated circuit package 74. A pole-piece 80 is attached to the opposite pole of the permanent magnet 78 and provides an axially extending and radially extending flux path. Positioned in radial alignment with the pole-piece 80 is the pole-piece 76 located on the radially exterior side of the vane 46. An air gap 82 is located between the permanent magnet 78 and the Hall effect sensor and integrated circuit package 74.

A printed circuit board 84, having conductive elements 86 located thereon, is positioned in a recess formed between lower plate 62 and the upper plate 66. Lead contacts 88 from the Hall effect sensor and integrated circuit packages 74 of signal generating mechanisms 36 and 38 are soldered to the conductive elements 86 of the printed circuit board 84. A suitable electrical connector 90 (FIG. 1) has four electrical lead wires 92 connected to it which extend through a rubber grommet 94 into the distributor housing 12. The lead wires 92 within the housing 12 terminate in a molded rubber connection and support structure 96 attached to the printed circuit board 84. The wires 92 make electrical connection with the appropriate conductive elements 86 of the printed circuit board.

FIGS. 4 and 5 depict the subassembly comprising the signal generating mechanisms 36 and 38 attached to the upper plate 66 and include the printed circuit board 84 and lead wires 92 connected thereto. In FIG. 4, it may be seen that the support structures of the signal generating mechanisms 36 and 38 are secured to the upper plate 66 with screws 98. Elongated openings 100 in the upper plate 66 are provided for attachment of the FIG. 4 subassembly to the lower plate 62 with screws 64. FIG. 5 depicts the underside of the subassembly shown in FIG. 4, and the printed circuit board 84 and its conductive elements 86 may be seen clearly. Also illustrated are the connections of the Hall effect sensors and integrated circuit packages 74 to the conductive elements 86 of the printed circuit board 84.

FIG. 6 schematically illustrates the electrical content of each of the Hall effect sensor and integrated circuit packages 74. This package includes a voltage regulator 102, a Hall sensor element 104, a trigger amplifier 106, and a circuit 108 including an output transistor 110. A package containing the circuitry illustrated in FIG. 6 is commercially available from the Micro Switch Division of Honeywell, Inc. The Hall effect sensor is a semiconductor device through which a current is passed. If the sensor is placed in a magnetic field having a direction normal to the direction of current flow, a voltage is developed across it in a direction normal to both the magnetic field and current flow. This voltage is supplied to the trigger amplifier 106, which amplifies the voltage signal. A threshold magnetic field is required to produce a change in the state of conductivity of the transistor 110 forming the output of the Hall effect sensor and integrated circuit package. If the magnetic field passing through the Hall effect sensor is periodically varied above and below this threshold, a pulsating DC electrical voltage is produced on the collector of the transistor 110 and forms the output of the signal generating mechanism as indicated in FIG. 6.

Of the four leads 92 connected to the printed circuit board 84, one of the leads may be connected through the ignition switch to the positive terminal of the internal combustion engine DC storage battery. Another of the leads may be connected to the negative or ground terminal thereof. This latter lead, to provide a good ground connection, may have a terminal connected to the exterior of the distributor housing 12 as well as to the printed circuit board 84. The other two of the leads 92 are connected to the respective output transistors 110 in the packages 74 of the signal generating mechanisms 36 and 38.

The operation of the signal generating mechanism of the invention may best be understood by reference to FIG. 3. The rotor 42 rotates with the shaft 16 and sleeve 22. As the rotor rotates, the vanes 46 repeatedly enter and leave the air gap 82 between the permanent magnet 78 and the Hall effect sensor and integrated circuit package 74.

The dotted lines in FIG. 3 form two closed loop paths illustrative of the magnetic flux pattern both when the air gap 82 has no vane 46 within it and when a vane 46 is within it. In the absence of a vane 46 within the air gap 82, the magnetic flux from the permanent magnet 78 passes through the Hall effect sensor and integrated circuit package 74 and then into the pole-piece 76. The flux then enters the pole-piece 80 and returns to the opposite side of the permanent magnet 78.

When a vane 46 enters the air gap 82, the vane forms a short-circuit for the magnetic flux. The magnetic flux then passes from the permanent magnet 78 into the vane 46 and is returned by pole-piece 80 to the opposite side of the permanent magnet. Thus, with the vane 46 within the air gap 82, the magnetic flux is substantially prevented from entering the Hall effect sensor and integrated circuit package 74. As a result, the output transistor 110 in the integrated circuit changes its state of conductivity each time a vane 46 enters and leaves the air gap 82. The output of the integrated circuit thus is a pulsating DC electrical voltage having a frequency proportional to the angular velocity of the shaft 16.

The distributor 10 may include a vacuum motor 112 (FIG. 1) having a movable arm 114 pivotally connected to the lower plate 62 of the stator assembly 50. Movement of the arm 114 to the left as viewed in FIG. 1 causes the components attached to the hub 60 to rotate about the bushing 54 and relative to the baseplate 52. This may be utilized to provide a vacuum advance of the engine ignition timing.

Based upon the foregoing description, what is claimed is:

1. A signal generating mechanism for producing a pulsating DC electrical signal having a frequency proportional to the angular velocity of a rotating shaft, said signal generating mechanism comprising, in combination: a baseplate fixed relative to said rotating shaft, said baseplate having an opening therein; an annular bushing affixed in said baseplate opening, said bushing extending above said baseplate, said shaft passing through said bushing; a stator assembly, said stator assembly including an annular hub positioned around the portion of said bushing extending above said baseplate, said hub being rotatable about said bushing, a lower plate parallel to said baseplate and affixed to said hub, an upper plate formed from a nonmagnetic material and attached to said lower plate, a support structure attached to said upper plate, a permanent magnet mounted in said support structure, said permanent magnet having its poles oriented to produce a magnetic flux in a direction radial with respect to said shaft, a Hall effect sensor and integrated circuit package mounted in said support structure and positioned in radial alignment with magnetic flux emanating from said permanent magnet, said Hall effect sensor and integrated circuit package being separated from said permanent magnet by an air gap, a printed circuit board having conductive elements positioned between said support structure and said lower plate, said Hall effect sensor and integrated circuit package having lead wires electrically connected to said conductive elements of said printed circuit board, and pole-pieces associated with said support structure and permanent magnet to provide a flux path; and a rotor attached to said shaft for rotation therewith, said rotor having cup-shaped and depending vanes extending in the axial direction of said shaft and positioned to come into and go out of said air gap as said rotor rotates with said shaft, said vanes short-circuiting magnetic flux emanating from said permanent magnet when said vanes are within said air gap between said permanent magnet and said Hall effect sensor and integrated circuit package.

2. A signal generating mechanism according to claim 1 wherein said pole-pieces associated with said support structure include a first pole-piece located on the radially exterior side of said Hall effect sensor and integrated circuit package and a second pole-piece located on the radially interior side of said air gap, said second pole-piece extending in both the axial and radial directions of said shaft.

3. A signal generating mechanism according to claim 1 which includes, attached to said upper plate, a second support structure, spaced from said first-mentioned support structure, a second permanent magnet and pole-pieces associated with said second support structure and second permanent magnet, and a second Hall effect sensor and integrated circuit package having lead wires electrically connected to conductive elements of said printed circuit board.

* * * * *